(12) United States Patent
Tatsuta et al.

(10) Patent No.: US 11,490,662 B2
(45) Date of Patent: *Nov. 8, 2022

(54) POWER SUPPLY UNIT FOR AEROSOL INHALER

(71) Applicant: Japan Tobacco Inc., Tokyo (JP)

(72) Inventors: Nobuhiro Tatsuta, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,119

(22) Filed: Apr. 8, 2021

(65) Prior Publication Data
US 2021/0219623 A1 Jul. 22, 2021

Related U.S. Application Data

(63) Continuation of application No. 17/088,581, filed on Nov. 4, 2020, now Pat. No. 11,000,066.

(30) Foreign Application Priority Data

Nov. 5, 2019 (JP) .............................. JP2019-201066

(51) Int. Cl.
*A24F 40/90* (2020.01)
*H02J 50/00* (2016.01)
(Continued)

(52) U.S. Cl.
CPC ............... *A24F 40/90* (2020.01); *A24F 40/50* (2020.01); *H02J 7/06* (2013.01); *H02J 50/005* (2020.01);
(Continued)

(58) Field of Classification Search
CPC . A24F 40/90; A24F 40/50; H02J 50/12; H02J 50/70; H02J 50/005; H02J 7/06; H02J 2207/20
(Continued)

(56) References Cited

U.S. PATENT DOCUMENTS 9,901,117 B2 2/2018 Levitz et al.
2011/0265806 A1 11/2011 Alarcon et al.
(Continued)

FOREIGN PATENT DOCUMENTS

CN 204089230 U 1/2015
JP 2014-75975 A 4/2014
(Continued)

OTHER PUBLICATIONS

Notice of Reasons for Refusal received for Japanese Patent Application No. 2019-201066, dated Feb. 12, 2020, 8 pages.
(Continued)

*Primary Examiner* — Michael R. Fin
(74) *Attorney, Agent, or Firm* — Xsensus LLP

(57) ABSTRACT

A power supply unit for an aerosol inhaler includes: a power supply capable of supplying power to a load capable of generating aerosol from an aerosol source; and a charger capable of controlling charging of the power supply, in which the power supply unit further includes: a power reception coil capable of receiving the power in a wireless manner, a converter configured to convert AC power into DC power, an AC conductive wire connecting the power reception coil and the converter, and a DC conductive wire connecting the converter and the charger and having a length equal to or greater than a length of the AC conductive wire.

13 Claims, 11 Drawing Sheets

(51) Int. Cl.
  *H02J 7/06* (2006.01)
  *H02J 50/12* (2016.01)
  *H02J 50/70* (2016.01)
  *A24F 40/50* (2020.01)

(52) U.S. Cl.
  CPC .............. *H02J 50/12* (2016.02); *H02J 50/70* (2016.02); *H02J 2207/20* (2020.01)

(58) Field of Classification Search
  USPC ........................................................ 307/104
  See application file for complete search history.

(56) References Cited

U.S. PATENT DOCUMENTS

| | | |
|---|---|---|
| 2012/0242447 A1 | 9/2012 | Ichikawa |
| 2013/0300350 A1 | 11/2013 | Xiang |
| 2014/0224267 A1 | 8/2014 | Levitz et al. |
| 2015/0053214 A1 | 2/2015 | Alarcon et al. |
| 2015/0059779 A1 | 3/2015 | Alarcon et al. |
| 2015/0303735 A1 | 10/2015 | Kari |
| 2015/0333561 A1 | 11/2015 | Alarcon |
| 2017/0196269 A1 | 7/2017 | Bemauer et al. |
| 2017/0368947 A1 | 12/2017 | Kume et al. |
| 2018/0140021 A1 | 5/2018 | Alarcon et al. |
| 2018/0146712 A1 | 5/2018 | Alarcon et al. |
| 2018/0192709 A1 | 7/2018 | Alarcon et al. |
| 2018/0242645 A1 | 8/2018 | Alarcon et al. |
| 2018/0271156 A1 | 9/2018 | Alarcon et al. |
| 2019/0297947 A1 | 10/2019 | Bessant et al. |
| 2019/0380390 A1 | 12/2019 | Jeong et al. |
| 2020/0128884 A1 | 4/2020 | Yamada et al. |
| 2020/0196670 A1 | 6/2020 | Alarcon et al. |
| 2020/0275711 A9 | 9/2020 | Alarcon et al. |
| 2020/0352255 A1 | 11/2020 | Jeong et al. |

FOREIGN PATENT DOCUMENTS

| | | |
|---|---|---|
| JP | 5767342 B2 | 8/2015 |
| JP | 2017-229180 A | 12/2017 |
| JP | 6326188 B2 | 5/2018 |
| JP | 2018-126355 A | 8/2018 |
| JP | 2019-510469 A | 4/2019 |
| JP | 6557391 B1 | 8/2019 |
| KR | 10-2019-0020720 A | 3/2019 |
| WO | 2015/137815 A1 | 9/2015 |

OTHER PUBLICATIONS

Decision to Grant a Patent received for Japanese Patent Application No. 2019-201066, dated Apr. 21, 2020, 5 pages.
European Search Report dated Jan. 18, 2021, in corresponding European Patent Application No. 20205397.1.
Korean Office Action dated Jan. 22, 2021, in corresponding Korean Patent Application No. 10-2020-0144148.

POWER SUPPLY UNIT FOR AEROSOL INHALER

CROSS-REFERENCE TO RELATED APPLICATIONS

This application is a continuation of U.S. application Ser. No. 17/088,581, filed Nov. 4, 2020, which claims priority to Japanese Patent Application No. 2019-201066 filed on Nov. 5, 2019, each of which is hereby expressly incorporated by reference into the present application.

TECHNICAL FIELD

The present invention relates to a power supply unit for an aerosol inhaler.

BACKGROUND ART

An aerosol inhaler capable of wireless charging and a power supply unit for the aerosol inhaler are known (U.S. Pat. No. 9,901,117 B, US 2015/0333561 A, JP 5767342 B, JP 6326188 B, JP 2018-126355 A, and JP 2019-510469 T). For example, U.S. Pat. No. 9,901,117 B discloses a large number of arrangement examples of power reception coils such as arranging a power reception coil capable of receiving power in a wireless manner at a lower portion of a housing, arranging a power reception coil so as to surround a rechargeable power supply, arranging a plurality of power reception coils, and arranging a power reception coil in a curved shape.

US 2015/0333561 A discloses a portable charging device in which a power transmission coil is arranged, and an aerosol inhaler including a weight for aligning the power transmission coil and a power reception coil.

In an aerosol inhaler capable of wireless charging and a power supply unit for the aerosol inhaler, heat may be generated due to a skin effect in an AC conductive wire through which an alternating current received in a wireless manner flows, which may affect circuit elements. Therefore, prevention of the heat generation in the AC conductive wire is desired. Here, the skin effect refers to a phenomenon in which, when a high frequency wave is applied to a conductor, an apparent resistance value is increased due to a biased current on a conductor surface.

An object of the present invention is to provide a power supply unit for an aerosol inhaler capable of preventing heat generation in an AC conductive wire due to a skin effect.

SUMMARY OF INVENTION

According to an aspect of the present invention, a power supply unit for an aerosol inhaler includes: a power supply capable of supplying power to a load capable of generating aerosol from an aerosol source; and a charger capable of controlling charging of the power supply, in which the power supply unit further includes: a power reception coil capable of receiving the power in a wireless manner, a converter configured to convert AC power into DC power, an AC conductive wire connecting the power reception coil and the converter, and a DC conductive wire connecting the converter and the charger and having a length equal to or greater than a length of the AC conductive wire.

DESCRIPTION OF EMBODIMENTS

Hereinafter, a power supply unit for an aerosol inhaler and the aerosol inhaler according to each embodiment of the present invention will be described.

(Aerosol Inhaler)

Figure 1:
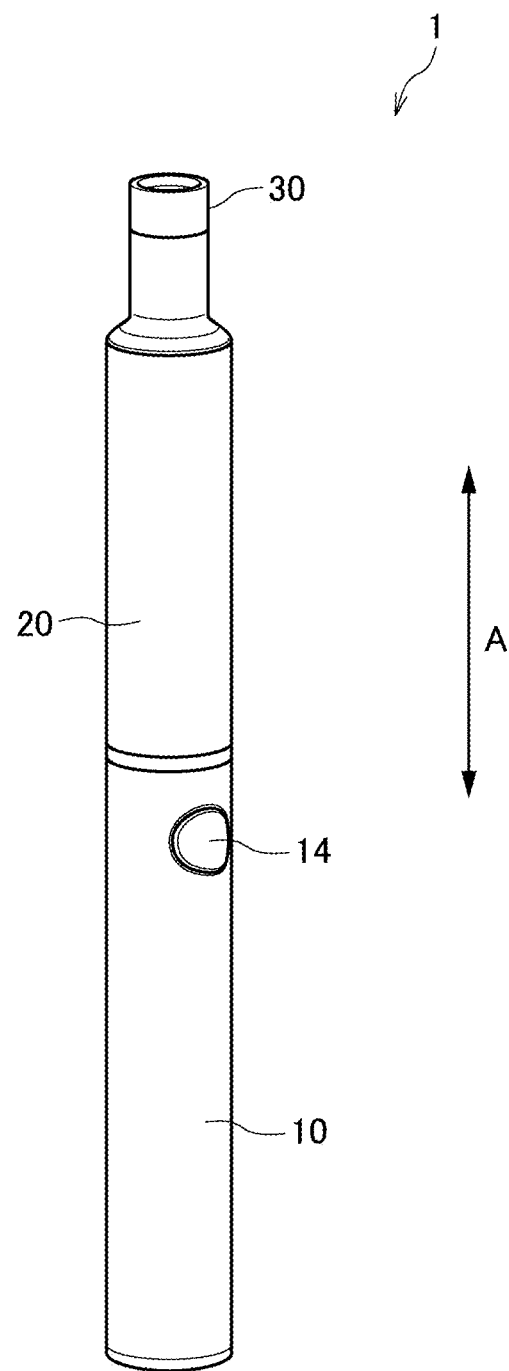
FIG. 1 is a perspective view of an aerosol inhaler equipped with a power supply unit according to a first embodiment of the present invention.

An aerosol inhaler 1 is a device for inhaling a flavor without combustion, and has a rod shape extending along a predetermined direction (hereinafter referred to as a longitudinal direction A). As shown in FIG. 1, the aerosol inhaler 1 is provided with a power supply unit 10, a first cartridge 20 and a second cartridge 30 in this order along the longitudinal direction A. The first cartridge 20 is attachable to and detachable from the power supply unit 10, and the second cartridge 30 is attachable to and detachable from the first cartridge 20. In other words, the first cartridge 20 and the second cartridge 30 are replaceable.

First Embodiment (Power Supply Unit)

Figure 2:
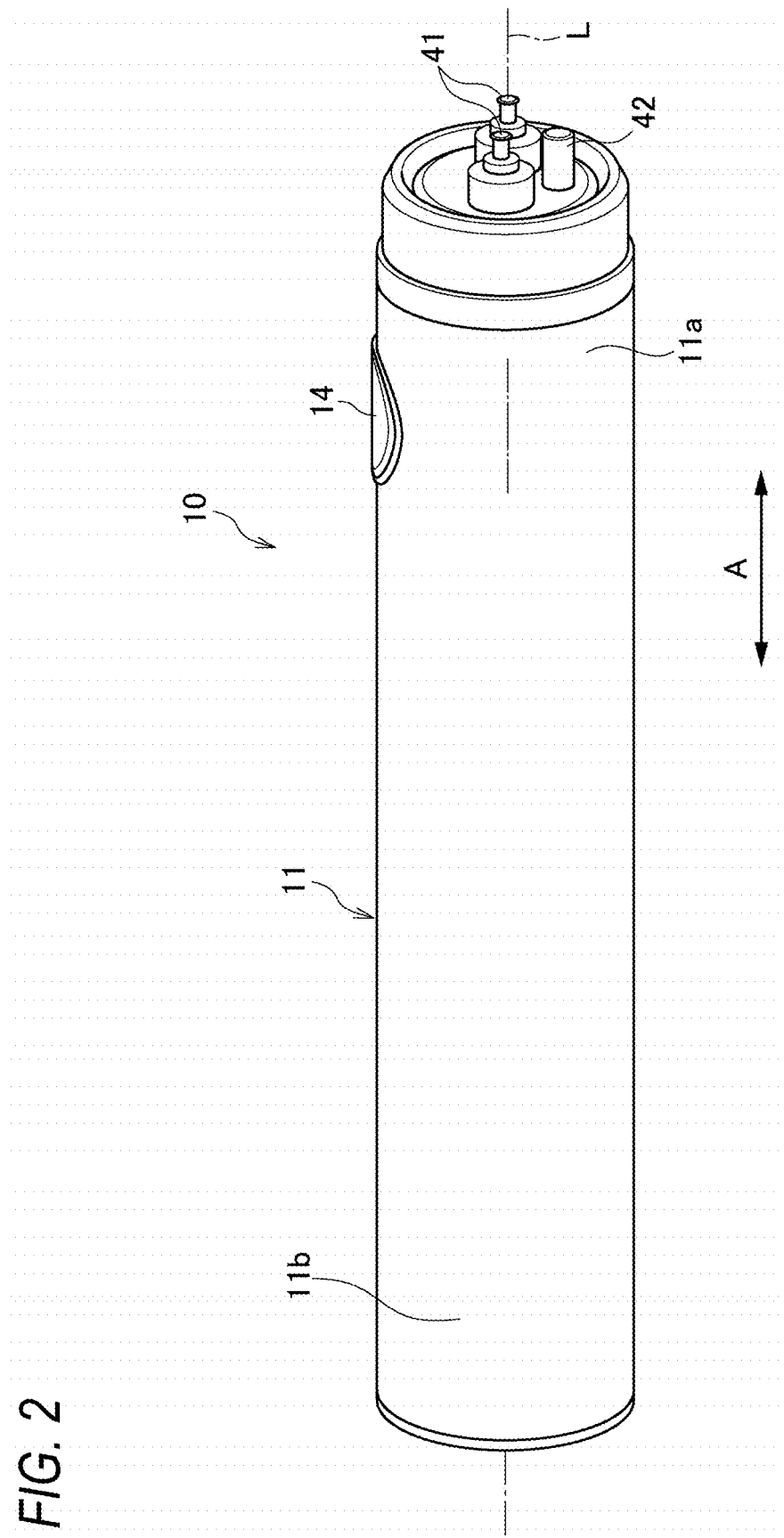
FIG. 2 is a perspective view of the power supply unit of the aerosol inhaler shown in FIG. 1.
Figure 3:
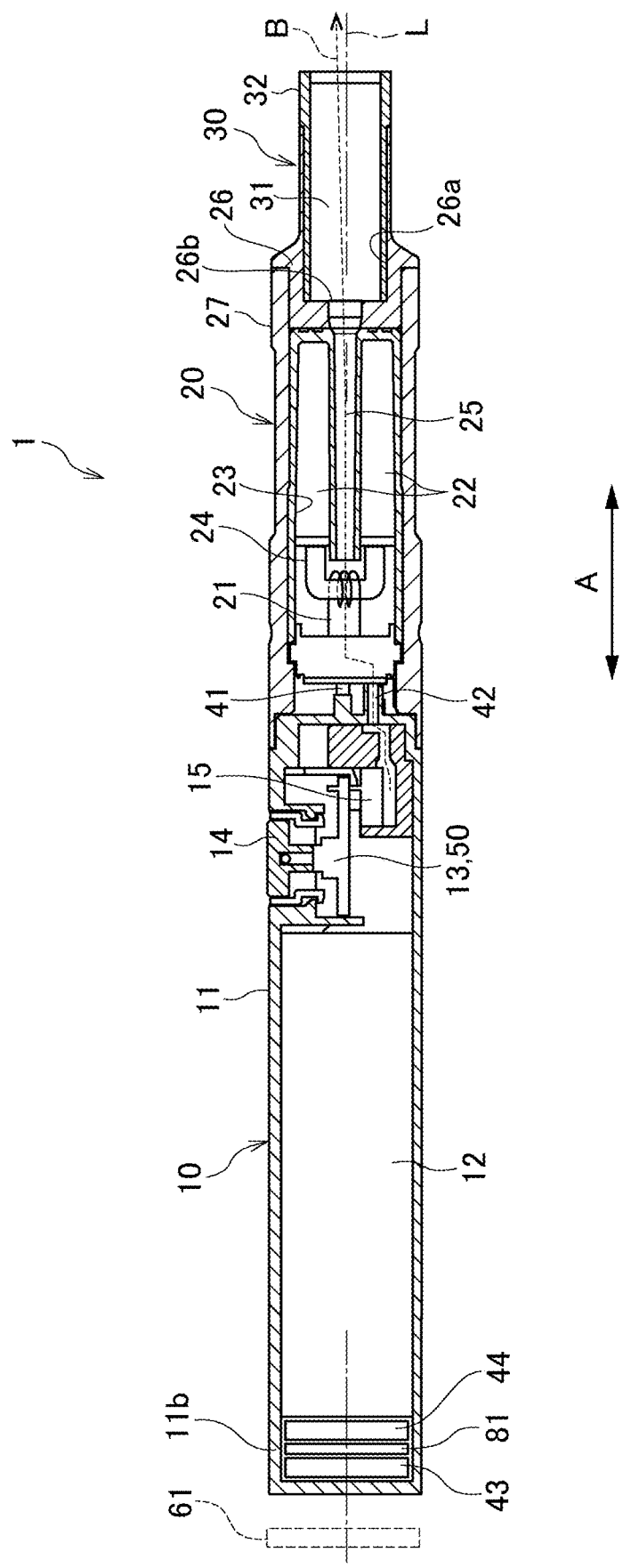
FIG. 3 is a sectional view of the aerosol inhaler shown in FIG. 1.

As shown in FIGS. 2 and 3, the power supply unit 10 according to a first embodiment accommodates a power supply 12, a charger 13, a control unit 50, various sensors and the like inside a cylindrical power supply unit case 11.

Discharge terminals 41 are provided on a top portion 11a located on one end side (a first cartridge 20 side) of the power supply unit case 11 in the longitudinal direction A. The discharge terminals 41 are provided so as to protrude from an upper surface of the top portion 11a toward the first cartridge 20, and are configured to be electrically connectable to a load 21 of the first cartridge 20.

An air supply portion 42 that supplies air to the load 21 of the first cartridge 20 is provided on the upper surface of the top portion 11a in vicinity of the discharge terminals 41.

A power reception coil 43 for charging the power supply 12 in a wireless manner with an external power supply (not shown) and a rectifier 44 that converts AC power received by the power reception coil 43 into DC power are accommodated in a bottom portion 11b located on the other end side (a side opposite to the first cartridge 20) of the power supply unit case 11 in the longitudinal direction A. A method of wireless power transfer may be an electromagnetic induction method, a magnetic resonance method, a combination of the electromagnetic induction method and the magnetic resonance method, or other methods. In any method of wireless power transfer, the power supply unit case 11 may or may not be in physical contact with the external power supply. In the present specification, the wireless power transfer is treated as being synonymous with non-contact power transfer.

A user-operable operation unit 14 is provided on a side surface of the top portion 11a of the power supply unit case 11. The operation unit 14 includes a button type switch, a touch panel and the like, and is used when the control unit 50 and various sensors are activated or shut off, which reflects intention of a user.

The power supply 12 is a rechargeable secondary battery, and is preferably a lithium ion secondary battery. The charger 13 controls charging power input from the rectifier 44 to the power supply 12. The charger 13 is configured by using a charging IC including a DC-DC converter, a voltmeter, an ammeter, a processor and the like.

Figure 4:
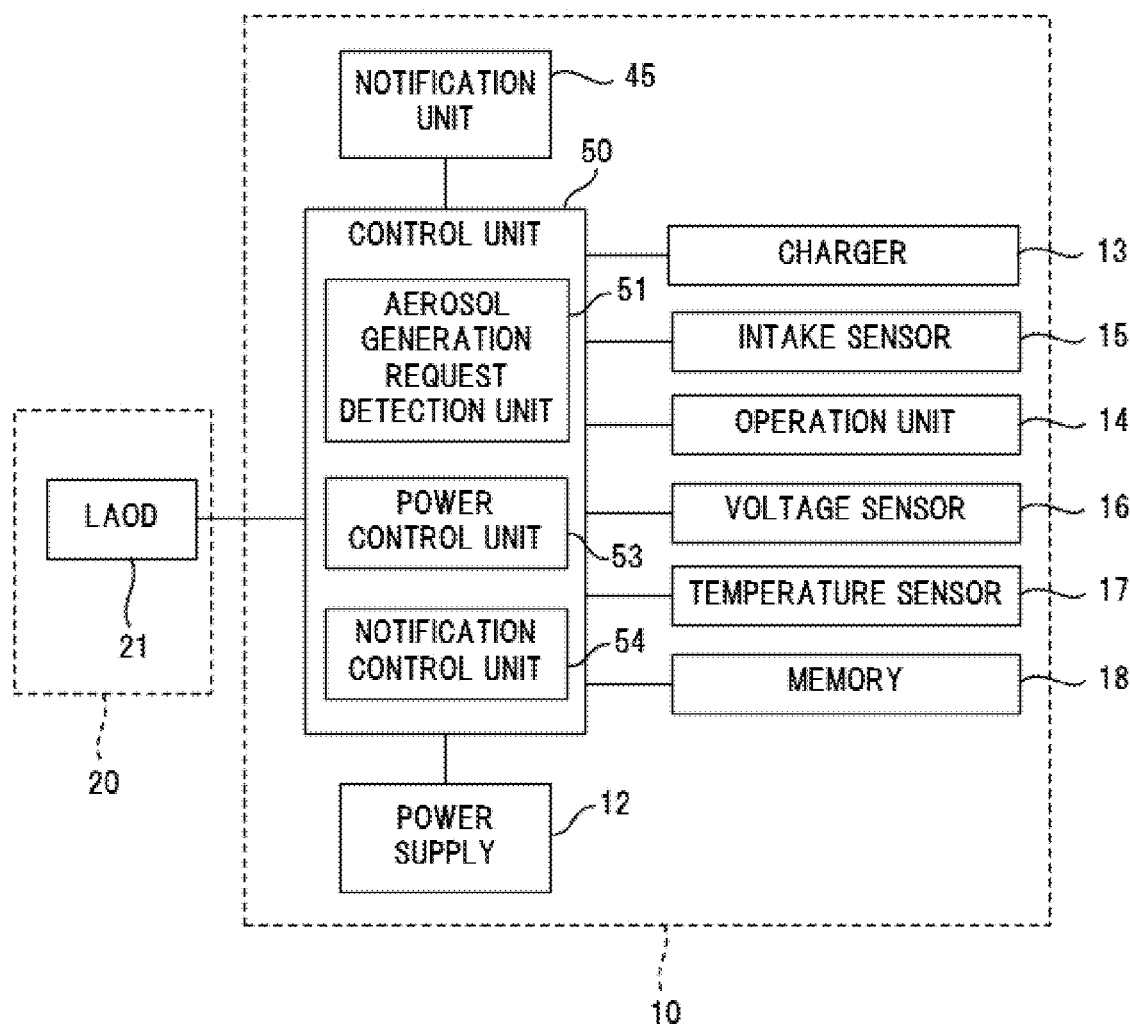
FIG. 4 is a block diagram showing a main part configuration of the power supply unit of the aerosol inhaler shown in FIG. 1.

As shown in FIG. 4, the control unit 50 is connected to the charger 13, the operation unit 14, various sensor devices such as an intake sensor 15 that detects a puff (intake) operation, a voltage sensor 16 that measures a voltage of the power supply 12, a temperature sensor 17 that detects a temperature, and a memory 18 that stores the number of puff operations or time for energizing the load 21. The control unit 50 performs various controls on the aerosol inhaler 1. The intake sensor 15 may be constituted by a condenser microphone, a pressure sensor or the like. Specifically, the control unit 50 is a processor (MCU: micro controller unit). More specifically, a structure of the processor is an electric circuit obtained by combining circuit elements such as semiconductor elements.

(First Cartridge)

As shown in FIG. 3, the first cartridge 20 includes, inside a cylindrical cartridge case 27, a reservoir 23 that stores an aerosol source 22, the electric load 21 that atomizes the aerosol source 22, a wick 24 that draws the aerosol source from the reservoir 23 to the load 21, an aerosol flow path 25 in which aerosol generated by atomization of the aerosol source 22 flows toward the second cartridge 30, and an end cap 26 that accommodates a part of the second cartridge 30.

The reservoir 23 is partitioned and formed so as to surround a periphery of the aerosol flow path 25, and stores the aerosol source 22. A porous body such as a resin web or cotton may be accommodated in the reservoir 23, and the aerosol source 22 may be impregnated in the porous body. The reservoir 23 may only store the aerosol source 22 without accommodating the porous body such as the resin web or the cotton. The aerosol source 22 includes a liquid such as glycerin, propylene glycol or water.

The wick 24 is a liquid holding member that draws the aerosol source 22 from the reservoir 23 to the load 21 by using a capillary phenomenon, and is formed of, for example, glass fiber or porous ceramic.

The load 21 atomizes the aerosol source 22 without combustion with the power supplied from the power supply 12 via the discharge terminals 41. The load 21 is formed of an electric heating wire (coil) wound at a predetermined pitch. The load 21 may be any element capable of generating the aerosol by atomizing the aerosol source 22, and is, for example, a heating element or an ultrasonic generator. Examples of the heating element include a heating resistor, a ceramic heater and an induction heating type heater.

The aerosol flow path 25 is provided on a downstream side of the load 21 and on a center line L of the power supply unit 10.

The end cap 26 includes a cartridge accommodation portion 26a that accommodates a part of the second cartridge 30, and a communication path 26b that allows the aerosol flow path 25 and the cartridge accommodation portion 26a to communicate with each other.

(Second Cartridge)

The second cartridge 30 stores a flavor source 31. The second cartridge 30 is detachably accommodated in the cartridge accommodation portion 26a provided in the end cap 26 of the first cartridge 20. An end portion of the second cartridge 30 on a side opposite to the first cartridge 20 is a suction port 32 for the user. The suction port 32 is not limited to being integrally formed with the second cartridge 30, but may be configured to be attachable to and detachable from the second cartridge 30. By configuring the suction port 32 separately from the power supply unit 10 and the first cartridge 20 in this way, the suction port 32 can be kept hygienic.

The second cartridge 30 imparts the flavor to the aerosol by passing the aerosol generated by atomizing the aerosol source 22 by the load 21 through the flavor source 31. As a raw material piece constituting the flavor source 31, chopped tobacco or a molded product obtained by molding a tobacco raw material into particles can be used. The flavor source 31 may be formed of a plant other than tobacco (for example, mint, Chinese herb or herb). The flavor source 31 may be provided with a fragrance such as menthol.

In the aerosol inhaler 1 according to the present embodiment, the aerosol to which the flavor is added can be generated by the aerosol source 22, the flavor source 31 and the load 21. That is, the aerosol source 22 and the flavor source 31 can be referred to as an aerosol generation source that generates the aerosol.

In addition to a configuration in which the aerosol source 22 and the flavor source 31 are separated from each other, a configuration in which the aerosol source 22 and the flavor source 31 are integrally formed, a configuration in which the flavor source 31 is omitted and substances that may be included in the flavor source 31 are added to the aerosol source 22, or a configuration in which a drug, a Chinese herb or the like instead of the flavor source 31 is added to the aerosol source 22 may also be employed as the configuration of the aerosol generation source used in the aerosol inhaler 1.

In the aerosol inhaler 1 configured as described above, as shown by an arrow B in FIG. 3, the air flowing in from an air intake port (not shown) provided in the power supply unit case 11 passes through vicinity of the load 21 of the first cartridge 20 from the air supply portion 42. The load 21 atomizes the aerosol source 22 drawn or moved from the reservoir 23 by the wick 24. The aerosol generated by atomization flows through the aerosol flow path 25 together with the air flowing in from the air intake port, and is supplied to the second cartridge 30 via the communication path 26b. The aerosol supplied to the second cartridge 30 is imparted the flavor by passing through the flavor source 31, and is supplied to the suction port 32.

The aerosol inhaler 1 is provided with a notification unit 45 that notifies various types of information. The notification unit 45 may be constituted by a light emitting element, a vibration element or a sound output element. The notification unit 45 may also be a combination of two or more elements among the light emitting element, the vibration element and the sound output element. The notification unit 45 may be provided in any of the power supply unit 10, the first cartridge 20 and the second cartridge 30, but is preferably provided in the power supply unit 10 in order to shorten a conductive wire from the power supply 12. For example, a periphery of the operation unit 14 is translucent, and is configured to emit light by a light emitting element such as an LED.

(Electric Circuit)

Next, an electric circuit of the power supply unit 10 will be described with reference to FIG. 5.

The power supply unit 10 includes the power supply 12, a positive electrode side discharge terminal 41a and a negative electrode side discharge terminal 41b constituting the discharge terminals 41, the control unit 50 connected between a positive electrode side of the power supply 12 and the positive electrode side discharge terminal 41a and between a negative electrode side of the power supply 12 and the negative electrode side discharge terminal 41b, a wireless charging circuit 46 including the power reception coil 43 and the rectifier 44, the charger 13 arranged on a power transmission path between the wireless charging circuit 46 and the power supply 12, and a switch 19 arranged on the power transmission path between the power supply 12 and the discharge terminals 41. The switch 19 is formed of, for example, a MOSFET, and is controlled to be opened and closed by the control unit 50 adjusting a gate voltage.

(Control Unit)

As shown in FIG. 4, the control unit 50 includes an aerosol generation request detection unit 51, a power control unit 53 and a notification control unit 54.

The aerosol generation request detection unit 51 detects an aerosol generation request based on an output result of the intake sensor 15. The intake sensor 15 is configured to output a value of a change in pressure in the power supply unit 10 caused by suction of the user through the suction port 32. The intake sensor 15 is, for example, a pressure sensor that outputs an output value (for example, a voltage value or a current value) corresponding to an air pressure that changes due to a flow rate of the air sucked from the air intake port toward the suction port 32 (that is, the puff operation of the user). The intake sensor may be configured to determine whether the detected flow rate or pressure of the air can correspond to the puff operation of the user and output one of an ON value and an OFF value.

The notification control unit 54 controls the notification unit 45 to notify various types of information. For example, the notification control unit 54 controls the notification unit 45 to notify a replacement timing of the second cartridge 30 according to detection of the replacement timing of the second cartridge 30. The notification control unit 54 notifies the replacement timing of the second cartridge 30 based on the number of the puff operations or the cumulative time for energizing the load 21 stored in the memory 18. The notification control unit 54 may notify not only the replacement timing of the second cartridge 30, but also a replacement timing of the first cartridge 20, a replacement timing of the power supply 12, a charging timing of the power supply 12 and the like.

When the aerosol generation request detection unit 51 detects the aerosol generation request, the power control unit 53 controls discharge of the power supply 12 via the discharge terminals 41 by turning on or turning off the switch 19.

The power control unit 53 performs control such that an amount of the aerosol generated by atomizing the aerosol source by the load 21 falls within a desired range, in other words, an amount of the power supplied from the power supply 12 to the load 21 falls within a certain range. Specifically, the power control unit 53 controls on/off of the switch 19 by, for example, pulse width modulation (PWM) control. Instead of this, the power control unit 53 may control the on/off of the switch 19 by pulse frequency modulation (PFM) control.

The power control unit 53 may stop power supply from the power supply 12 to the load 21 when a predetermined period has elapsed since the power supply to the load 21 is started. In other words, the power control unit 53 stops the power supply from the power supply 12 to the load 21 when a puff period exceeds the predetermined period even within the puff period when the user actually performs the puff operation. The predetermined period is set in order to reduce variations in the puff period of the user. The power control unit 53 controls a duty ratio of the on/off of the switch 19 during one puff operation according to an amount of electricity stored in the power supply 12. For example, the power control unit 53 controls an on-time interval (a pulse interval) for supplying power from the power supply 12 to the load 21, and controls an on-time length (a pulse width) for supplying power from the power supply 12 to the load 21.

The power control unit 53 detects power reception from the external power supply by the power reception coil 43, and controls charging of the power supply 12 via the charger 13.

(Wireless Charging Circuit)

Figure 5:
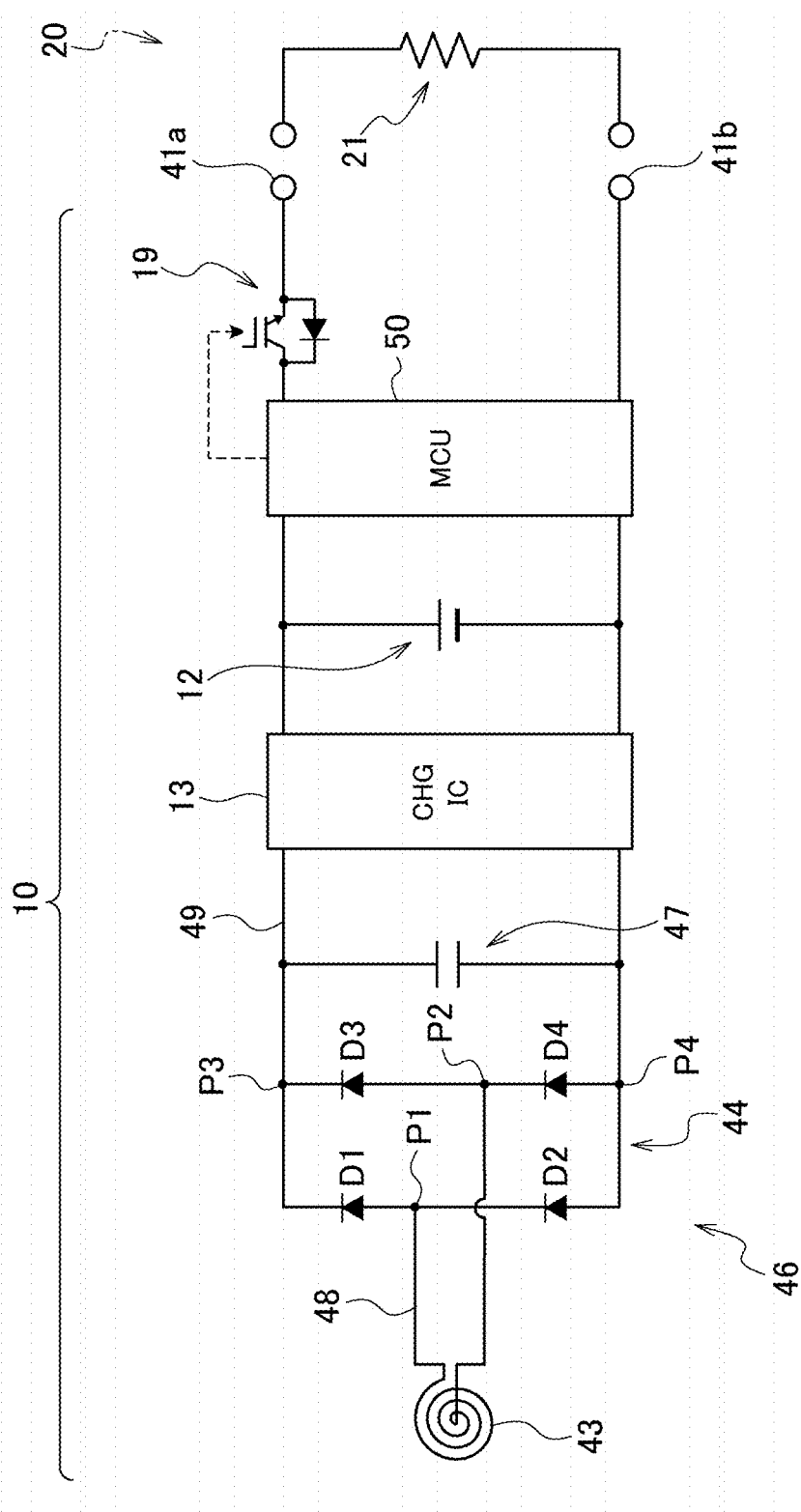
FIG. 5 is a schematic diagram showing a circuit configuration of the power supply unit of the aerosol inhaler shown in FIG. 1.

As shown in FIG. 5, the wireless charging circuit 46 includes the power reception coil 43, the rectifier 44, a smoothing capacitor 47, an AC conductive wire 48 and a DC conductive wire 49.

Figure 6:
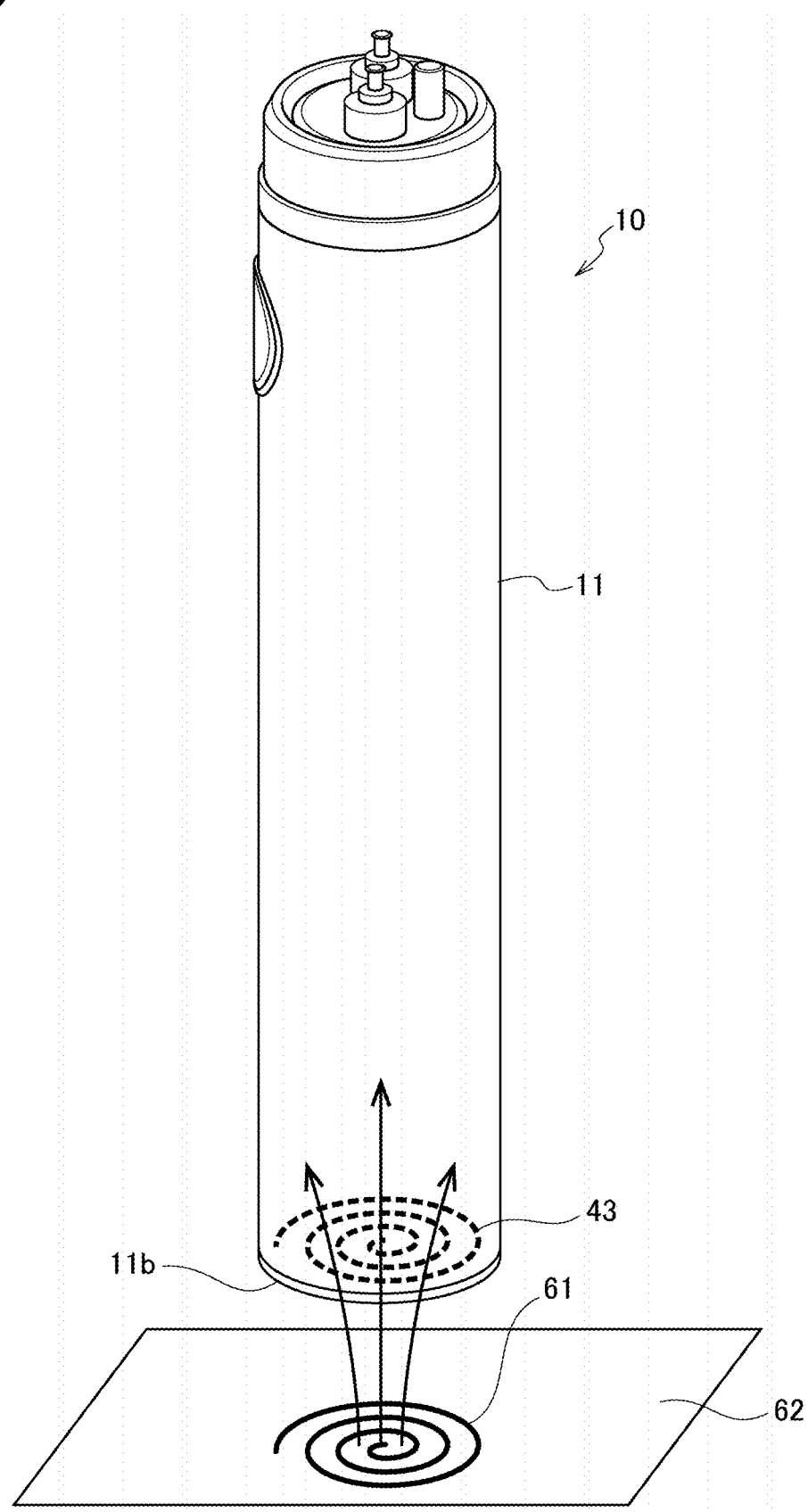
FIG. 6 is a perspective view schematically showing a state of wireless charging of the power supply unit of the aerosol inhaler shown in FIG. 1.

During charging, the power reception coil 43 is arranged close to a power transmission coil 61 that is excited by the AC power from the external power supply in the wireless manner, and receives the AC power from the power transmission coil 61 in the wireless manner. For example, as shown in FIG. 6, in the power supply unit 10 according to the present embodiment, when the power supply unit case 11 is placed vertically, with the bottom portion 11b thereof facing downward, above a charging mat 62 in which the power transmission coil 61 is installed, the power reception coil 43 comes close to the power transmission coil 61 of the charging mat 62 in the wireless manner, and the power can be received from the power transmission coil 61. "Vertically" means that the longitudinal direction is placed in a substantially vertical direction.

The rectifier 44 converts the AC power received by the power reception coil 43 into the DC power. The DC power converted by the rectifier 44 is smoothed by the smoothing capacitor 47. The rectifier 44 according to the present embodiment is a full-wave rectifier circuit in which four diodes D1 to D4 are bridge-connected, and may be a half-wave rectifier circuit. To describe the rectifier 44 according to the present embodiment more specifically, an anode of the diode D1 and a cathode of the diode D2 are connected to the AC conductive wire 48 extending from one end of the power reception coil 43 at a first connection point P1, and an anode of the diode D3 and a cathode of the diode D4 are connected to the AC conductive wire 48 extending from the other end of the power reception coil 43 at a second connection point P2. Cathodes of the diodes D1 and D3 are connected to the positive electrode side DC conductive wire 49 at a third connection point P3, and anodes of the diodes D2 and D4 are connected to the negative electrode side DC conductive wire 49 at a fourth connection point P4.

The AC conductive wire 48 connects the power reception coil 43 and the rectifier 44, and supplies the AC power received by the power reception coil 43 to the rectifier 44. Since the AC power flows through the AC conductive wire 48, heat may be generated due to a skin effect.

The DC conductive wire 49 connects the rectifier 44 and the charger 13, and supplies the DC power converted by the rectifier 44 to the charger 13. Unlike the AC conductive wire 48, the DC conductive wire 49 does not generate heat due to the skin effect.

Here, a length of the DC conductive wire 49 is equal to or greater than a length of the AC conductive wire 48. The DC conductive wire 49 is preferably not the same length as the AC conductive wire 48 but longer than the AC conductive wire 48. In this way, since the AC conductive wire 48 can be shortened, heat generation in the AC conductive wire 48 due to the skin effect and influence of the heat generation in the AC conductive wire 48 on circuit elements can be prevented. In particular, a decrease in power transmission efficiency due to increase in temperature of the power reception coil 43 caused by the heat generation in the AC conductive wire 48 when the magnetic resonance method is used can be prevented. The circuit elements include, in addition to the rectifier 44, the charger 13 and circuit elements included in the control unit 50, capacitors and resistors provided on a board (not shown) on which these are mounted.

The AC conductive wire 48 is preferably a Litz wire formed by twisting a plurality of conductive wires (for example, enameled wires). In this way, since cross-sectional area of each conductive wire is reduced, the skin effect of the AC conductive wire 48 can be effectively prevented. Accordingly, the heat generation in the AC conductive wire 48 due to the skin effect and the influence of the heat generation in the AC conductive wire 48 on the circuit elements can be further prevented. Similarly, the decrease in power transmission efficiency in the magnetic resonance method can be prevented.

(Arrangement Configuration)

As shown in FIG. 3, inside the power supply unit case 11, the power reception coil 43 and the rectifier 44 are arranged in the bottom portion 11b, and the charger 13 is arranged on a side opposite to the power reception coil 43 and the rectifier 44 with respect to the power supply 12. The power reception coil 43 is arranged below the power supply 12 in the vertical direction during charging to be capable of receiving the power while the power supply unit case 11 is placed vertically, and when the charging is performed by using the charging mat 62, a distance between the power reception coil 43 and the power transmission coil 61 is shortened, so that the power transmission efficiency is improved. Further, since the charger 13 is arranged on a side opposite to the power reception coil 43 with the power supply 12 interposed therebetween, influence of a leakage magnetic field of the power reception coil 43 on the charger 13 can be prevented.

The power reception coil 43 and the rectifier 44 may be arranged on one of one end side and the other end side of the power supply 12 in the longitudinal direction A. In second and third embodiments described below, the power reception coil 43 and the rectifier 44 are arranged above the power supply 12 in the vertical direction while the power supply unit case 11 is placed vertically. Since the power reception coil 43 and the rectifier 44 are arranged on one of one end side and the other end side of the power supply 12, the AC conductive wire 48 connecting the power reception coil 43 and the rectifier 44 does not need to cross or traverse the power supply 12 that is the largest among components of the aerosol inhaler 1, so that the AC conductive wire 48 is shortened and the skin effect is reduced.

The power reception coil 43 and the rectifier 44 may be arranged on either one of one end side and the other end side of the power supply 12 in a direction orthogonal to the longitudinal direction A. Although the elongated cylindrical power supply unit 10 is illustrated in the present embodiment, the power supply unit case 11 of the power supply unit 10 may be a rectangular columnar body having rectangular upper and lower surfaces, or an elliptical columnar body having elliptical upper and lower surfaces, or may have an oval shape as a whole. In this case, if the charger 13 is arranged on the side opposite to the power reception coil 43 with the power supply 12 interposed therebetween in the direction orthogonal to the longitudinal direction A, the influence of the leakage magnetic field of the power reception coil 43 on the charger 13 can be prevented more appropriately.

(Magnetic Shield)

As shown in FIG. 3, a shield 81 that protects the circuit elements from the leakage magnetic field of the power reception coil 43 is provided in the power supply unit case 11 that accommodates the power reception coil 43. The shield 81 is formed of ferrite, a soft magnetic material or the like, and can shield or reduce the leakage magnetic field by absorbing leakage magnetic flux.

As shown in FIGS. 3 and 6, when the power reception coil 43 is arranged along a bottom surface of the power supply unit case 11 to be capable of receiving the power while the power supply unit case 11 is placed vertically, the shield 81 is preferably arranged so as to cover at least an upper surface of the power reception coil 43. In this way, since the shield 81 that covers the upper surface of the power reception coil 43 is used, the leakage magnetic field can be effectively shielded without using a large shield member. A recess may be formed on a lower surface of the shield 81, and the power reception coil 43 may be arranged in the recess. In this way, shielding capacity of the leakage magnetic field can be significantly improved.

Since power supply unit case 11 accommodates the power reception coil 43, the shield 81, the rectifier 44 and the power supply 12 in order from below in the vertical direction during charging while being placed vertically above the charging mat 62, three problems of effectively shielding the leakage magnetic field, protecting the rectifier 44 from the leakage magnetic field and reducing the skin effect can be simultaneously solved.

Next, second to fourth embodiments of the power supply unit 10 will be sequentially described with reference to FIGS. 7 to 11. Note that description of the first embodiment is incorporated by denoting the same configurations as those of the first embodiment with the same reference numerals as in the first embodiment.

Second Embodiment

Figure 7:
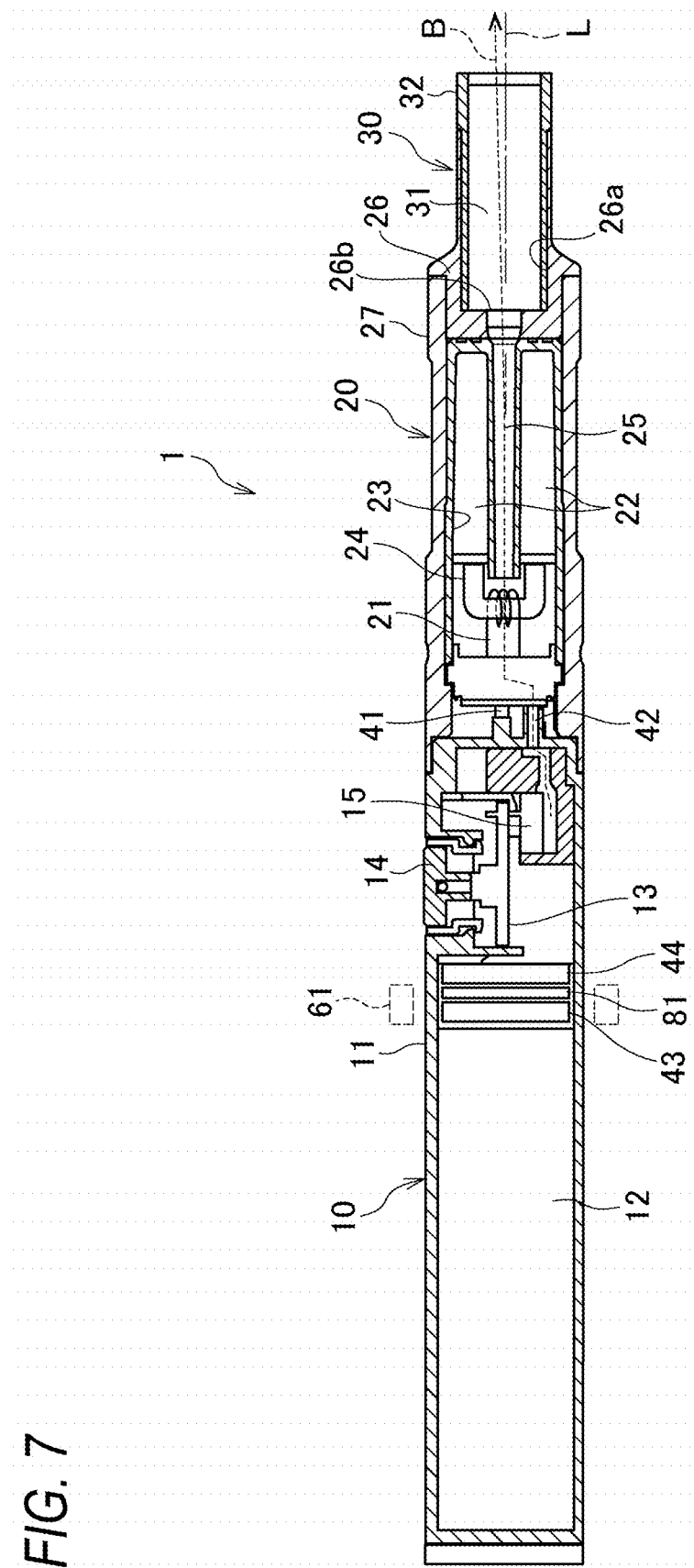
FIG. 7 is a sectional view of an aerosol inhaler according to a second embodiment of the present invention.
Figure 8:
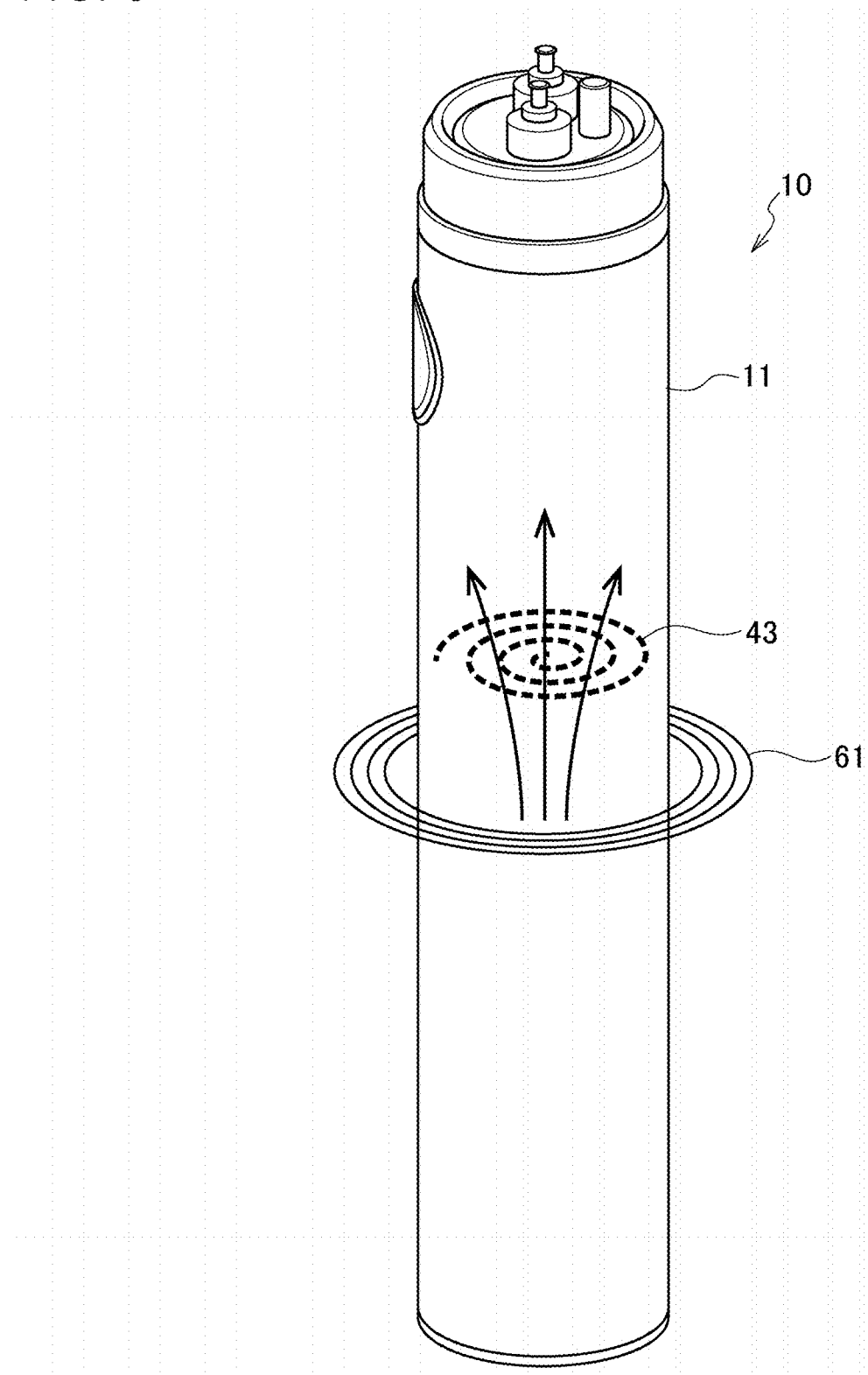
FIG. 8 is a perspective view schematically showing a state of wireless charging of a power supply unit of the aerosol inhaler shown in FIG. 7.

As shown in FIGS. 7 and 8, the power supply unit 10 according to the second embodiment is different from the power supply unit 10 according to the first embodiment in that the power reception coil 43, the shield 81, the rectifier 44 and the charger 13 are arranged above the power supply 12 in the vertical direction in the power supply unit case 11 when the power supply unit 10 is charged while being placed vertically. In this way, since the power supply 12 having a large weight is positioned below the power reception coil 43, the shield 81, the rectifier 44 and the charger 13 in the vertical direction when the power supply 12 is charged, a center of gravity is lowered, and stability during placement can be improved. When the power supply unit 10 according to the second embodiment is charged, a charging stand (not shown) including the power transmission coil 61 through which the power supply unit case 11 can penetrate is used. The charging mat 62 in the first embodiment may be used instead of the charging stand. When the charging mat 62 is used in the present embodiment, power transfer is preferably performed by the magnetic resonance method.

Third Embodiment

Figure 9:
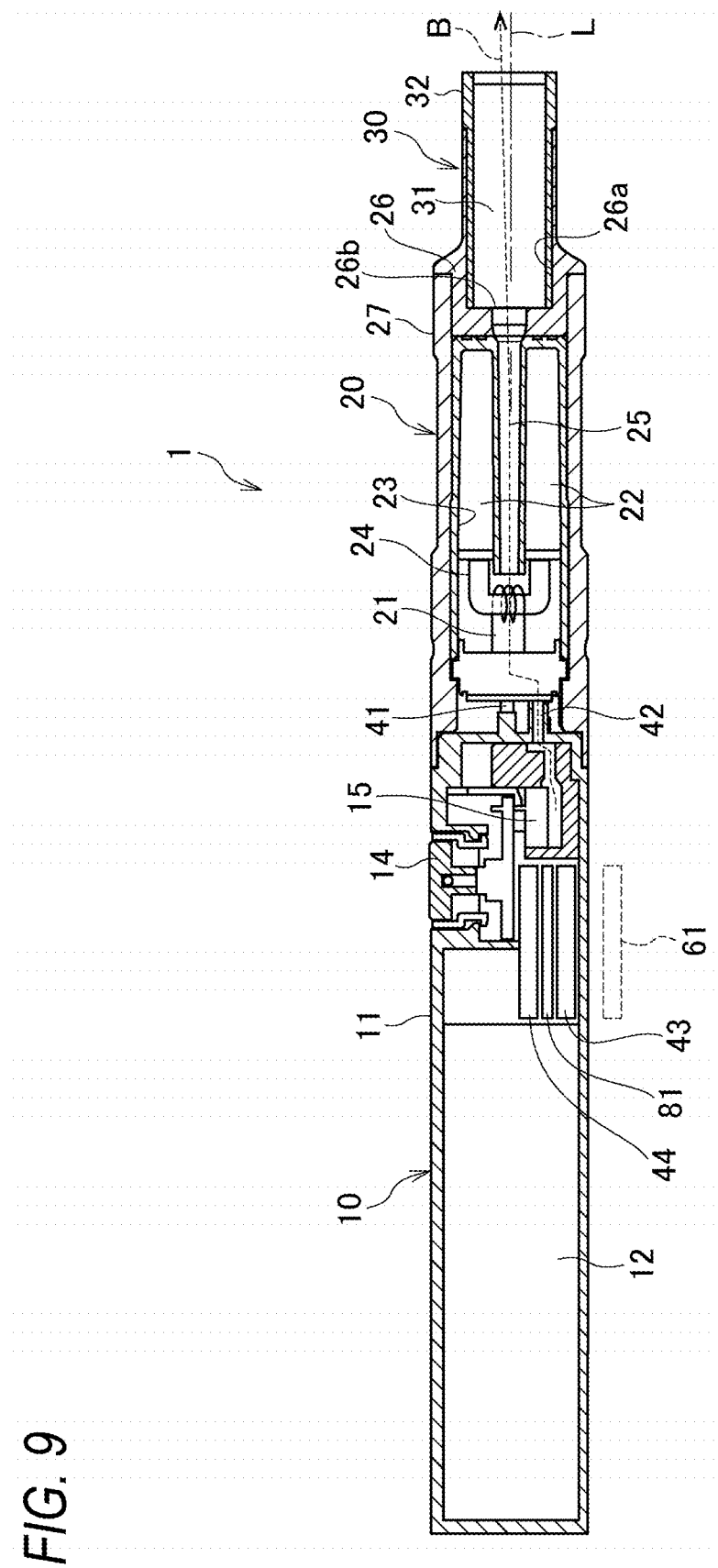
FIG. 9 is a sectional view of an aerosol inhaler according to a third embodiment of the present invention.
Figure 10:
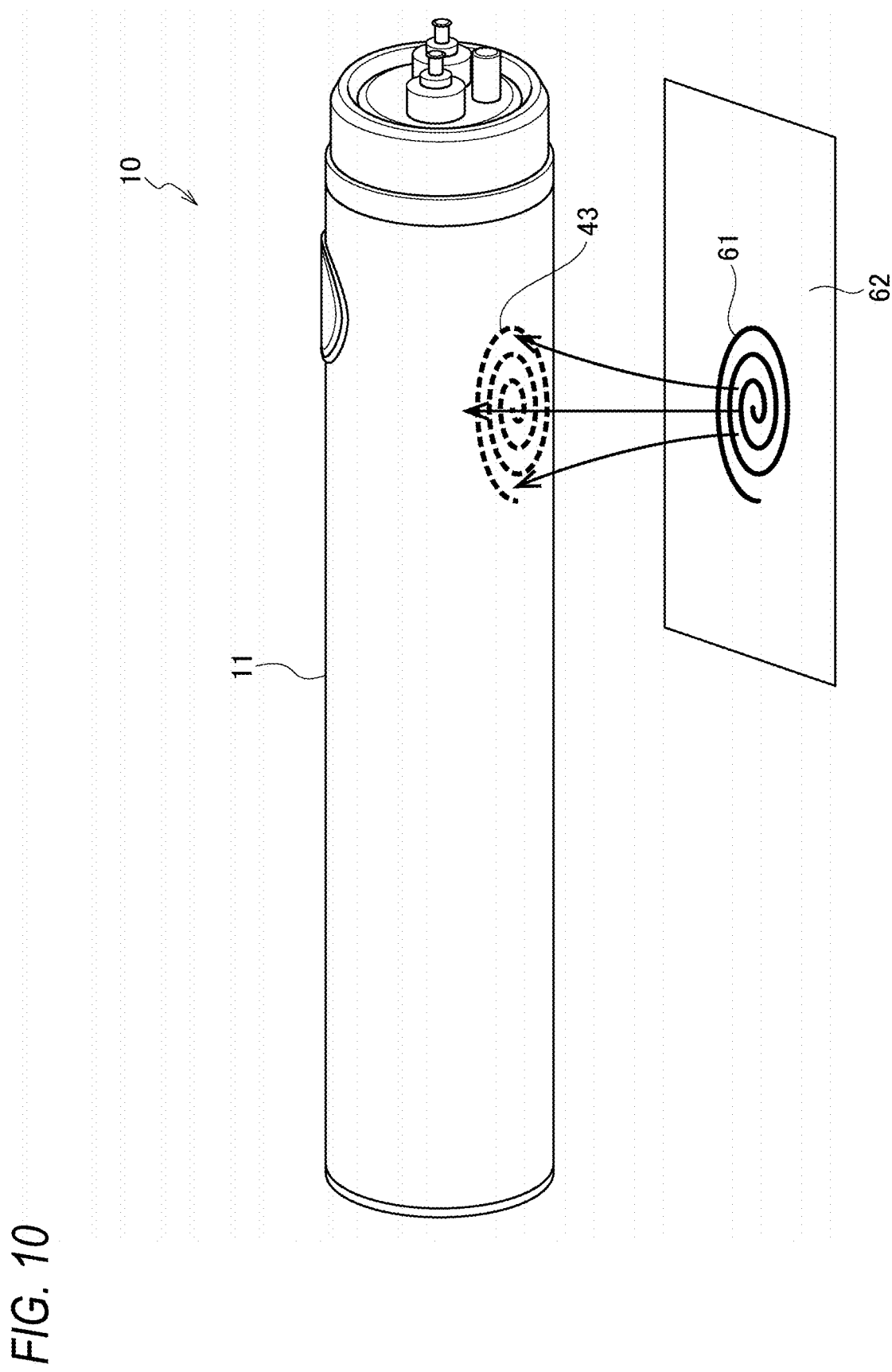
FIG. 10 is a perspective view schematically showing a state of wireless charging of a power supply unit of the aerosol inhaler shown in FIG. 9.

As shown in FIGS. 9 and 10, the power supply unit 10 according to the third embodiment is different from the power supply unit 10 according to first and second embodiments in that the power reception coil 43 is configured to be capable of receiving power in a wireless manner when the power supply unit case 11 is placed horizontally. Specifically, the power reception coil 43 is arranged in the power supply unit case 11 such that the power reception coil 43 is close to the power transmission coil 61 only within a predetermined angular range in which the power supply unit case 11 is placed horizontally and rotated in a rolling direction so that the power can be received. "Horizontally" means that the longitudinal direction is placed in a substantially horizontal direction. In this case, the power supply unit case 11 is preferably provided with a position regulation portion such that the power supply unit 10 can be maintained within the predetermined angular range in which the power can be received.

The power supply unit 10 according to the third embodiment also includes the shield 81. The shield 81 is configured to protect circuit elements from a magnetic field (a magnetic field from the power transmission coil 61 and a leakage magnetic field of the power reception coil 43 in a state where the power supply unit case 11 is placed horizontally such that power reception efficiency of the power reception coil 43 is maximized, and at a specific angle at which the power supply unit case 11 is rotated in the rolling direction from the state. Specifically, the shield 81 is arranged so as to cover a back surface side of the power reception coil 43, or the shield 81 is arranged so as to surround the circuit elements. In this way, the circuit elements can be protected from the magnetic field without using an excessive shield member, and the power supply unit 10 can be reduced in size and weight.

The shield 81 may be configured to protect the circuit elements from the magnetic field in the state where the power supply unit case 11 is placed horizontally such that the power reception efficiency of the power reception coil 43 is maximized, and at any angle at which the power supply unit case 11 is rotated in the rolling direction from the state. For example, a portion other than the power reception coil 43 may be covered with a flexible shield member, a portion other than the power reception coil 43 may be surrounded by a tubular shield member, or a region other than a region where the power reception coil 43 of the power supply unit case 11 is arranged is formed of a metal that does not transmit magnetic flux.

Fourth Embodiment

Figure 11:
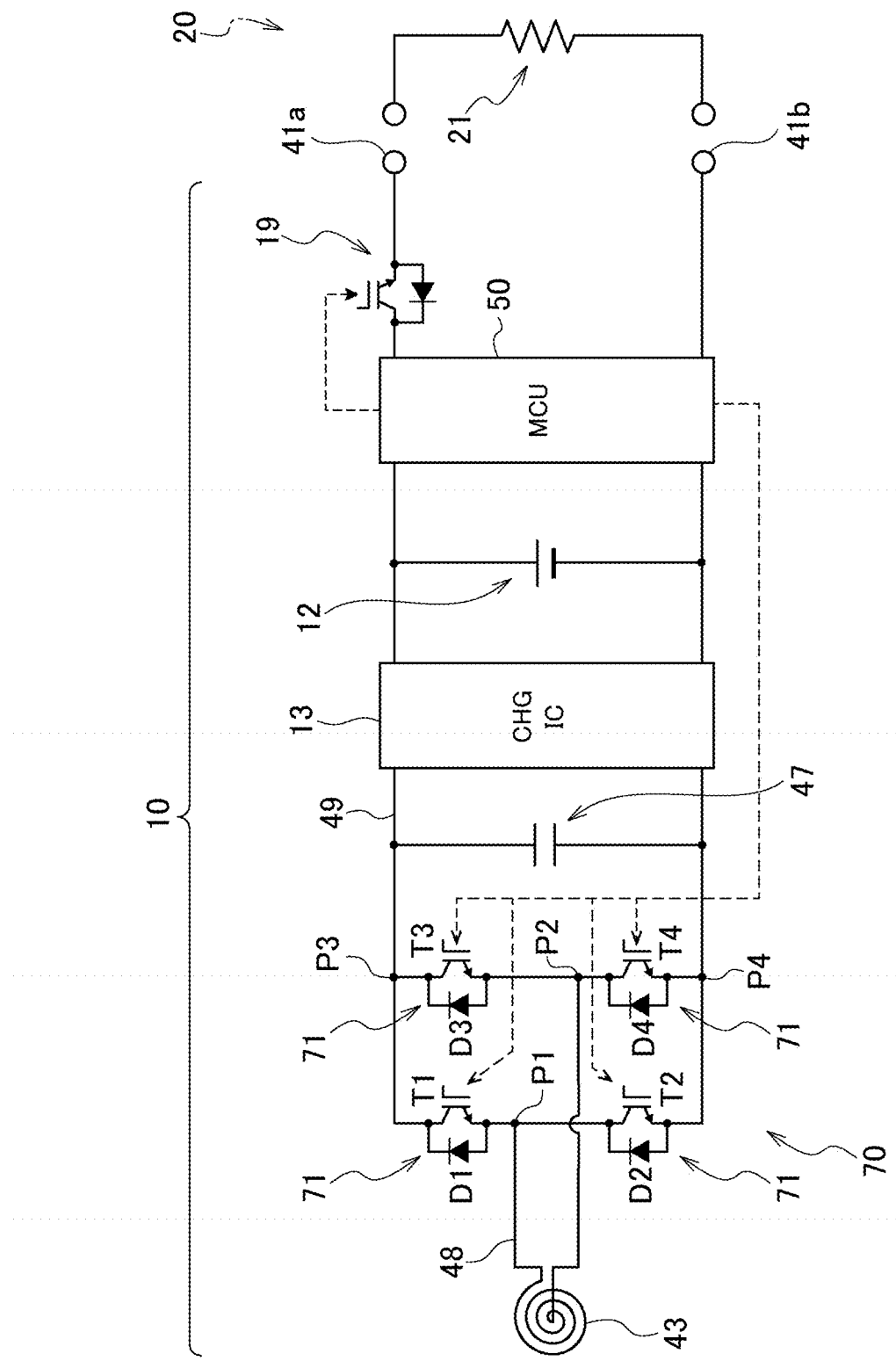
FIG. 11 is a schematic diagram showing a circuit configuration of a power supply unit of an aerosol inhaler according to a fourth embodiment of the present invention.

As shown in FIG. 11, the power supply unit 10 according to the fourth embodiment is different from that according to the first embodiment in that an inverter 70 is provided as a converter instead of the rectifier 44. The inverter 70 converts AC power received by the power reception coil 43 into DC power. The inverter 70 according to the present embodiment is formed by bridge-connecting four switching elements 71. The switching element 71 is, for example, a transistor such as an insulated gate bipolar transistor (IGBT) or a metal oxide semi-conductor field effect transistor (MOSFET), and opening and closing control is performed by the control unit 50 adjusting a gate voltage.

To describe the inverter 70 according to the present embodiment more specifically, an emitter of a transistor T1 and a collector of a transistor T2 are connected to the AC conductive wire 48 extending from one end of the power reception coil 43 at the first connection point P1, and an emitter of a transistor T3 and a collector of a transistor T4 are connected to the AC conductive wire 48 extending from the other end of the power reception coil 43 at the second connection point P2. Collectors of the transistor T1 and the transistor T3 are connected to the positive electrode side DC conductive wire 49 at the third connection point P3, and emitters of the transistor T2 and the transistor T4 are connected to the negative electrode side DC conductive wire 49 at the fourth connection point P4. Each of the diodes D1 to D4 connected in a forward direction from the emitter to the collector is provided between the collector and the emitter of each of transistors T1 to T4. Since the inverter 70 is used instead of the rectifier 44, the power reception coil 43 can be used as a power transmission coil.

That is, the power reception coil 43 can be excited by power of the power supply 12 while a power reception coil of the other device is brought close to the power reception coil 43, and the power can be transmitted to the power reception coil of the other device. At this time, the inverter 70 converts DC power supplied from the power supply 12 into AC power by repeating a state where the transistors T1, T4 are turned on and the transistors T2, T3 are turned off and a state where the transistors T1, T4 are turned off and the transistors T2, T3 are turned on. When the inverter 70 converts the AC power received by the power reception coil 43 into the DC power, all the transistors T1 to T4 are controlled to be turned off.

The present invention is not limited to the above embodiments, and can be appropriately modified, improved and the like.

The present specification describes at least the following matters. Although corresponding constituent elements or the like in the above embodiments are illustrated in parentheses, the present invention is not limited thereto.

(1) A power supply unit (power supply unit 10) for an aerosol inhaler (aerosol inhaler 1) including: a power supply (power supply 12) capable of supplying power to a load (load 21) capable of generating aerosol from an aerosol source; and a charger (charger 13) capable of controlling charging of the power supply, in which the power supply unit further includes: a power reception coil (power reception coil 43) capable of receiving the power in a wireless manner, a converter (rectifier 44, inverter 70) configured to convert AC power into DC power, an AC conductive wire (AC conductive wire 48) connecting the power reception coil and the converter, and a DC conductive wire (DC conductive wire 49) connecting the converter and the charger and having a length equal to or greater than a length of the AC conductive wire.

According to (1), since the length of the DC conductive wire connecting the converter and the charger is set to be equal to or greater than the length of the AC conductive wire connecting the power reception coil and the converter, heat generation due to a skin effect caused by an alternating current received in the wireless manner flowing through the AC conductive wire can be prevented.

(2) The power supply unit for the aerosol inhaler according to (1), in which the DC conductive wire is longer than the AC conductive wire.

According to (2), since the length of the DC conductive wire connecting the converter and the charger is longer than the AC conductive wire connecting the power reception coil and the converter, the heat generation in the AC conductive wire can be more effectively prevented.

(3) The power supply unit for the aerosol inhaler according to (1) or (2), further including: a housing (power supply unit case 11) accommodating the power supply, the power reception coil and the converter, in which the power reception coil and the converter are arranged on one of one end side and the other end side of the power supply.

According to (3), since the AC conductive wire connecting the power reception coil and the converter does not need to cross or traverse the power supply that is the largest among components of the aerosol inhaler, the AC conductive wire is shortened and the skin effect is reduced.

(4) The power supply unit for the aerosol inhaler according to (3), in which the housing further accommodates the charger, and in which the power reception coil, the converter and the charger are arranged above the power supply in a vertical direction when the power supply is charged.

According to (4), since the power supply having a large weight is positioned below the power reception coil, the converter and the charger in the vertical direction when the power supply is charged, a center of gravity is lowered and stability during placement is improved. In particular, since a liquid is present in the housing in the aerosol inhaler, the stability during placement is important.

(5) The power supply unit for the aerosol inhaler according to (3), in which the housing further accommodates the charger, in which the charger is arranged above the power supply in a vertical direction when the power supply is charged, and in which the power reception coil and the converter are arranged below the power supply in the vertical direction when the power supply is charged.

According to (5), since the power reception coil is arranged below the power supply in the vertical direction when the power supply is charged, when a charging mat is used, a distance between the power reception coil and a power transmission coil is shortened, so that power transmission efficiency is improved. Further, since the charger is arranged on a side opposite to the power reception coil with the power supply interposed therebetween, influence of the leakage magnetic field on a circuit board on which the charger is mounted can be prevented.

(6) The power supply unit for the aerosol inhaler according to any one of (1) to (5), further including: a housing (power supply unit case 11) configured to accommodate the power reception coil, in which a circuit element, a shield (shield 81) capable of protecting the circuit element from a magnetic field, or shielding or reducing a leakage magnetic field in the power reception coil are provided in the housing.

According to (6), the shield can protect the circuit element from the magnetic field or the leakage magnetic field of the power reception coil.

(7) The power supply unit for the aerosol inhaler according to (6), in which the power reception coil is configured to be capable of receiving the power in the wireless manner when the housing is placed vertically, and in which the shield covers at least a part of the power reception coil.

According to (7), since the shield that covers the power reception coil is used, the leakage magnetic field can be effectively shielded without using a large shield.

(8) The power supply unit for the aerosol inhaler according to (6), in which the power reception coil is configured to be capable of receiving the power in the wireless manner when the housing is placed vertically, and in which the housing accommodates the power reception coil, the shield, the converter and the power supply in order from below in the vertical direction when the power supply is charged.

According to (8), since the power reception coil, the shield, the converter and the power supply are arranged in order from below in the vertical direction in the housing when the power supply is charged, three problems of effectively shielding the leakage magnetic field, protecting the converter from the leakage magnetic field and reducing the skin effect can be simultaneously solved.

(9) The power supply unit for the aerosol inhaler according to (8), in which the power reception coil is configured to be capable of receiving the power in the wireless manner when the housing is placed horizontally, and in which the shield is configured to protect the circuit element from the magnetic field or to shield or reduce the leakage magnetic field in the power reception coil in a state where the housing is placed horizontally such that power reception efficiency of the power reception coil is maximized, and at a specific angle at which the housing is rotated in a rolling direction from the state.

According to (9), since the shield is used in the state where the housing is placed horizontally and at the specific angle at which the housing is rotated in the rolling direction from the stat, the circuit element can be protected from the leakage magnetic field without using an excessive shield and the power supply unit can be reduced in size and weight.

(10) The power supply unit for the aerosol inhaler according to (6), in which the power reception coil is configured to be capable of receiving the power in the wireless manner when the housing is placed horizontally, and in which the shield is configured to protect the circuit element from the magnetic field or to shield or reduce the leakage magnetic field in the power reception coil in a state where the housing is placed horizontally such that power reception efficiency of the power reception coil is maximized, and at any angle at which the housing is rotated in a rolling direction from the state.

According to (10), since the shield is used in the state where the housing is placed horizontally and at any angle at which the housing is rotated in the rolling direction from the state, the circuit element can be protected from the leakage magnetic field no matter how the housing is placed on a power reception mat.

(11) The power supply unit for the aerosol inhaler according to any one of (1) to (10), in which the AC conductive wire is configured by twisting a plurality of conductive wires.

According to (11), since the AC conductive wire is configured by twisting the plurality of conductive wires, cross-sectional area of each conductive wire is reduced and the skin effect can be effectively prevented.

(12) The power supply unit for the aerosol inhaler according to any one of (1) to (11), in which the converter is a rectifier (rectifier 44) or an inverter (inverter 70).

According to (12), since the converter can be the rectifier or the inverter having high versatility, manufacturing cost can be reduced.

(13) A power supply unit (power supply unit 10) for an aerosol inhaler (aerosol inhaler 1) including: a power supply (power supply 12) capable of supplying power to a load (load 21) capable of generating aerosol from an aerosol source; and a charger (charger 13) capable of controlling charging of the power supply, in which the power supply unit further includes: a power reception coil (power reception coil 43) capable of receiving the power in a wireless manner, a converter (rectifier 44) configured to convert AC power into DC power, an AC conductive wire (AC conductive wire 48) connecting the power reception coil and the converter, and a housing (power supply unit case 11) configured to accommodate the power supply, the charger, the power reception coil, the converter and the AC conductive wire, and in which the power reception coil and the converter are arranged on one of one end side and the other end side of the power supply.

According to (13), the AC conductive wire connecting the power reception coil and the converter does not need to cross or traverse the power supply that is the largest among components of the aerosol inhaler. Thereby, the AC conductive wire is shortened and heat generation due to a skin effect caused by an alternating current received in the wireless manner flowing through the AC conductive wire can be prevented.

(14) The power supply unit for the aerosol inhaler according to (13), in which the charger is arranged on the other of one end side and the other end side of the power supply.

According to (14), since the charger is arranged on a side opposite to the power reception coil and the converter with the power supply interposed therebetween, influence of the leakage magnetic field on a circuit board on which the charger is mounted can be prevented.

What is claimed is:

1. A power supply for an aerosol inhaler comprising:
- a power supply configured to supply power to a load capable of generating aerosol from an aerosol source;
- charging circuitry configured to control charging of the power supply;
- a power reception coil configured to receive the power in a wireless manner;
- a converter configured to convert AC power into DC power;
- an AC conductive wire connecting the power reception coil and the converter; and
- a DC conductive wire connecting the converter and the charging circuitry and having a length equal to or greater than a length of the AC conductive wire.

2. The power supply of claim 1, further comprising:
a housing accommodating the power supply, the power reception coil, the charging circuitry, and the converter, wherein
the charging circuitry is arranged above the power supply in a vertical direction when the power supply is charged.

3. The power supply of claim 1, further comprising:
a housing accommodating the power reception coil; and
a circuit element provided in the housing.

4. The power supply of claim 1, wherein
the DC conductive wire is longer than the AC conductive wire.

5. The power supply of claim 1, wherein
the AC conductive wire is configured by twisting a plurality of conductive wires.

6. The power supply of claim 1, wherein
the converter is a rectifier.

7. The power supply of claim 1, further comprising:
a housing accommodating the power supply, the power reception coil, the charging circuitry, and the converter.

8. The power supply of claim 7, wherein
the power reception coil, the converter and the charging circuitry are arranged above the power supply in a vertical direction when the power supply is charged.

9. The power supply of claim 2, wherein
the power reception coil and the converter are arranged below the power supply in the vertical direction when the power supply is charged.

10. The power supply of claim 3, further comprising:
a shield provided in the housing and configured to protect the circuit element from a magnetic field or shielding or reducing a leakage magnetic field of the power reception coil.

11. The power supply of claim 10, wherein
the power reception coil is configured to receive the power in the wireless manner when the housing is placed vertically.

12. The power supply of claim 11, wherein
the housing accommodates the power reception coil, the shield, the converter and the power supply in order from below in the vertical direction when the power supply is charged.

13. The power supply of claim 12,
wherein the shield is configured to protect the circuit element from the magnetic field or to shield or reduce the leakage magnetic field of the power reception coil in a state where the housing is placed horizontally such that power reception efficiency of the power reception coil is maximized, and at any angle at which the housing is rotated in a rolling direction from the state.

* * * * *